(12) United States Patent
Agulnik et al.

(10) Patent No.: US 9,306,991 B2
(45) Date of Patent: Apr. 5, 2016

(54) ENHANCED PUSH TO TALK SYSTEMS AND METHODS WITH FLOOR CONTROL AND MEDIA TRAFFIC OPTIMIZATION

(71) Applicant: MOTOROLA SOLUTIONS, INC., Schaumburg, IL (US)

(72) Inventors: Anatoly Agulnik, Deerfield, IL (US); Madhusudan K. Pai, Bangalore (IN); Udaya Shankara P. S., Bangalore (IN); Shrinivas Shetti, Karnataka (IN)

(73) Assignee: MOTOROLA SOLUTIONS, INC., Schuamburg, IL (US)

( * ) Notice: Subject to any disclaimer, the term of this patent is extended or adjusted under 35 U.S.C. 154(b) by 554 days.

(21) Appl. No.: 13/652,762

(22) Filed: Oct. 16, 2012

(65) Prior Publication Data

US 2014/0106808 A1 Apr. 17, 2014

(51) Int. Cl.
*H04B 7/00* (2006.01)
*H04W 4/00* (2009.01)
*H04L 29/06* (2006.01)

(52) U.S. Cl.
CPC ........ *H04L 65/4061* (2013.01); *H04L 65/1069* (2013.01); *H04L 65/4038* (2013.01); *H04L 65/608* (2013.01); *H04L 65/80* (2013.01)

(58) Field of Classification Search
CPC .............................. H04W 4/10; H04W 76/005
USPC ........ 455/518, 519, 414.1, 517; 370/312, 252
See application file for complete search history.

(56) References Cited

U.S. PATENT DOCUMENTS

| | | | |
|---|---|---|---|
| 6,275,471 B1 | 8/2001 | Bushmitch et al. | |
| 6,567,929 B1 | 5/2003 | Bhagavath et al. | |
| 7,054,302 B2 | 5/2006 | Albal et al. | |
| 7,127,496 B2 | 10/2006 | Isozu et al. | |
| 7,457,862 B2 | 11/2008 | Hepworth et al. | |
| 7,493,117 B2 | 2/2009 | Cai et al. | |
| 7,650,159 B2 * | 1/2010 | Poikselka | ..................... 455/518 |
| 7,744,012 B2 | 6/2010 | Manders | |
| 7,764,668 B2 | 7/2010 | Yoshizawa | |
| 7,764,971 B2 | 7/2010 | Chu et al. | |

(Continued)

FOREIGN PATENT DOCUMENTS

| | | |
|---|---|---|
| EP | 1 838 034 A1 | 9/2007 |
| EP | 2 211 587 A1 | 7/2010 |

(Continued)

OTHER PUBLICATIONS

International Search Report and Written Opinion for counterpart International Patent application PCT/US2013/66510 mailed Feb. 27, 2014.

(Continued)

*Primary Examiner* — Tilahun B Gesesse
(74) *Attorney, Agent, or Firm* — Daniel R. Bestor

(57) ABSTRACT

An enhanced push to talk (PTT) method, a network, and a PTT server provide floor control and media traffic optimization for push to talk over cellular (PoC). Specifically, multiple Session Initiation Protocol (SIP) sessions are contemplated between controlling and participating servers while only requiring a single Real Time Protocol (RTP) session for media and a single Real Time Control Protocol (RTCP) session for floor control. In the single RTP and RTCP session, the synchronization source identifier (SSRC) can be used to differentiate between users equipment (UEs) at the controlling and participating servers.

20 Claims, 9 Drawing Sheets

(56) References Cited

U.S. PATENT DOCUMENTS

| | | | |
|---|---|---|---|
| 7,774,012 B2* | 8/2010 | Chowdhury et al. | 455/518 |
| 7,885,199 B2 | 2/2011 | Mooney et al. | |
| 8,000,732 B2* | 8/2011 | Albertsson et al. | H04L 65/4061 455/518 |
| 8,166,520 B2 | 4/2012 | Holm et al. | |
| 2002/0077136 A1* | 6/2002 | Maggenti et al. | H04L 63/0428 455/518 |
| 2004/0133683 A1 | 7/2004 | Keller et al. | |
| 2006/0046758 A1* | 3/2006 | Emami-Nouri et al. | 455/518 |
| 2007/0054686 A1* | 3/2007 | Allen et al. | 455/518 |
| 2007/0097886 A1 | 5/2007 | Schwagmann et al. | |
| 2007/0100941 A1 | 5/2007 | Lee et al. | |
| 2007/0112914 A1* | 5/2007 | Sung et al. | 709/205 |
| 2008/0076403 A1 | 3/2008 | Park et al. | |
| 2009/0005100 A1 | 1/2009 | Copeland | |
| 2009/0270119 A1* | 10/2009 | Li et al. | 455/518 |
| 2011/0019604 A1 | 1/2011 | Chun et al. | |
| 2011/0231558 A1* | 9/2011 | Holm | 709/227 |
| 2012/0170502 A1 | 7/2012 | Korus et al. | |
| 2013/0196706 A1 | 8/2013 | Patel et al. | |

FOREIGN PATENT DOCUMENTS

| | | |
|---|---|---|
| WO | 2008119396 A1 | 10/2008 |
| WO | 2009052859 A1 | 4/2009 |
| WO | 2009121406 A1 | 10/2009 |

OTHER PUBLICATIONS

Kenneth C. Budka et al. "Public Safety Mission Critical Voice Services Over LTE", Bell Labs Technical Journal, Special Issue: Vertical Markets, vol. 16, Issue 3, Jan. 2011.

"Push to talk over cellular (PoC) Architecture: OMA-AD-POC-V2-1-20110802-A," Open Mobile Alliance (OMA), San Diego, CA, USA, No. 2.1, Aug. 2, 2011, Retrieved from the interner URL: http://member.openmobilealliance.org/ftp/public_documents/COM/COM-POC/Permanent_documents/, on Jun. 17, 2014, pp. 1-129.

"Project 25 : P25 and/or APCO-25," Association of Public Safety Communications Officials-International (APCO), Oct. 1989, Retrieved from the internet url: http://www.mctx.org/departments_d-k/departments_q-z/radio_shop/docs/p25.htm, on Jun. 17, 2014, pp. 1-4.

"Project 25 Inter-RF Subsytem Interface Protocol(s) (ISSI) defined in TIA-102.BACA-A", Jan. 2009, Retrieved from the internet url: http://www.nist.gov/itl/antd/emntg/ps_p25_issi.cfm, on Jun. 17, 2014, pp. 1-2.

"Universal Mobile Telecommunications System (UMTS); LTE; Multimedia Broadcast/Multicast Service (MBMS); Architecture and functional description (3PP TS 23.246 version 10.3.0 Release 10)," Technical Specification, European Telecommunications Standards Institute (ETSI), France, vol. 3GPP SA 2, No. V10.3.0, Mar. 1, 2012, section 11, pp. 1-67.

Non-Final Office Action mailed Feb. 24, 2014, in U.S. Appl. No. 13/190,768, Eitan Koren et al., filed Jul. 26, 2011.

Schulzrinne et al., "RTP: A Transport Protocol for Real-Time Applications, "RFC 3550, Jul. 1, 2003, Copyright (C) The Internet Society (2003), Retrieved at http://tools.ietf.org/html/rfc3550, on Jun. 17, 2014, pp. 1-104.

International Search Report and Written Opinion for counterpart International Patent Application No. PCT/US2012/046566 mailed Apr. 16, 2013.

International Search Report and Written Opinion for counterpart International Patent Application No. PCT/US2013/064050 mailed Dec. 6, 2013.

International Search Report and Written Opinion for counterpart International Patent Application No. PCT/US13/66510 mailed Feb. 27, 2014.

Final Office Action mailed Sep. 24, 2015 to U.S. Appl. No. 13/664,527, filed Oct. 31, 2012—Agulnik, et al.

* cited by examiner

ENHANCED PUSH TO TALK SYSTEMS AND METHODS WITH FLOOR CONTROL AND MEDIA TRAFFIC OPTIMIZATION

CROSS REFERENCE TO RELATED APPLICATION

The present application is related to U.S. patent application Ser. No. 13/664,527, entitled "Enhanced Network-Network Interface Systems and Methods for Multimedia Broadcast Multicast Services," which application is commonly owned and filed on Oct. 31, 2012.

FIELD OF THE DISCLOSURE

The present disclosure relates generally to wireless networking and more particularly to systems and methods for enhanced push to talk (PTT) systems and methods with floor control and media traffic optimization.

BACKGROUND

In wireless networks, PTT systems and group methods generally are a half-duplex communication system where one person transmits and others receive. Push to talk over cellular (PoC) includes PTT on 2.5G, 3G, and/or 4G wireless networks. PTT can utilize Session Initiation Protocol (SIP), Real Time Protocol (RTP), Real Time Control Protocol (RTCP), etc. PTT systems and methods are used in a variety of applications such as, for example, mission critical public safety applications. In various PTT applications, there can be various users that participate in PTT calls outside their associated home server. As such, various conventional network-network interface (NNI) techniques have been developed between servers for handling PTT services. An exemplary NNI is the Open Mobile Alliance (OMA) Push to talk Over Cellular V2.1 (August, 2011), the contents of which are incorporated by reference herein. Another exemplary NNI is the Project 25 Inter-RF Subsystem Interface Protocol(s) (ISSI) defined in TIA-102.BACA-A (January 2009), the contents of which are incorporated by reference herein. OMA PoC V2.1, ISSI, etc. each have disadvantages in supporting large scale group sessions and resource negotiations (e.g., floor control). For example, OMA PoC V2.1 includes media traffic optimization but requires individual RTP/RTCP sessions for each user equipment (UE).

Accordingly, there is a need for enhanced PTT systems and methods with floor control and media traffic optimization.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
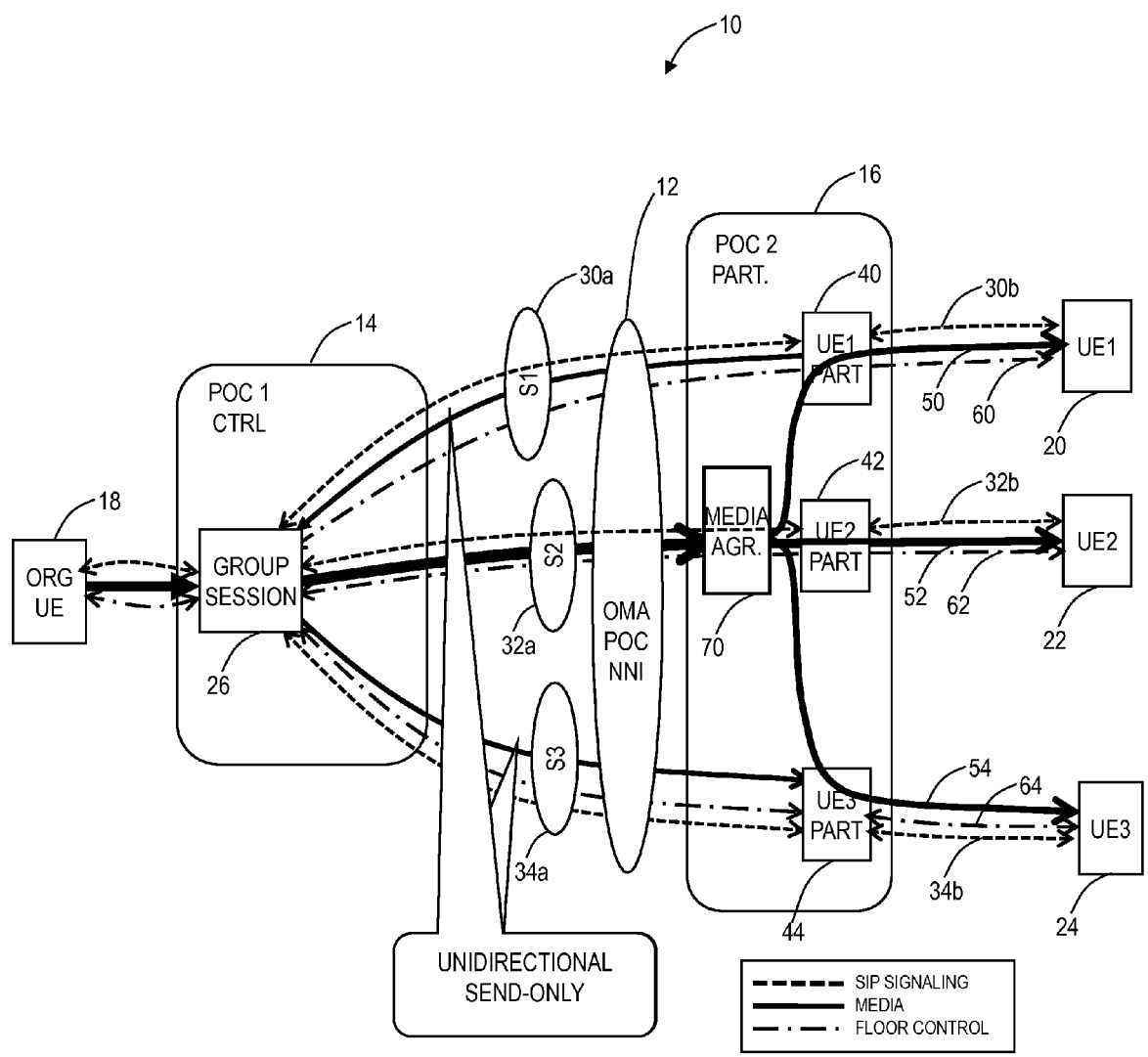
FIG. 1 is a network diagram of a network with media traffic optimization using an OMA PoC V2.1 NNI between servers in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, enhanced PTT systems and methods provide a NNI interface between controlling and participating servers with both floor control and media traffic optimization. Specifically, the enhanced PTT systems and methods contemplate multiple SIP sessions between the controlling and participating servers while only requiring a single RTP session for media and a single RTCP session for floor control. In the single RTP and RTCP session, the enhanced PTT systems and methods can utilize the synchronization source identifier (SSRC) to differentiate between users equipment (UEs). That is, on the single RTP and RTCP session, the SSRC is used to identify the floor requestor and the target of individual floor control messages from the controlling server. The enhanced PTT systems and methods contemplate interworking with existing OMA PoC standards and provide NNI enhancements by reducing floor control traffic between the controlling and participating servers.

In an exemplary embodiment, an enhanced push to talk (PTT) method for establishing a group session between a controlling server and a participating server includes establishing a first Session Initiation Protocol (SIP) session for a first user equipment (UE) between the controlling server and the participating server; establishing a Real Time Protocol (RTP) session and a Real Time Control Protocol (RTCP) session between the controlling server and the participating server; establishing a second SIP session for a second UE between the controlling server and the participating server; and utilizing the RTP session for providing media and the RTCP session for providing floor control for both the first UE and the second UE between the controlling server and the participating server; wherein the first UE and the second UE are homed at the participating server and the group is homed at the controlling server.

In another exemplary embodiment, a network includes a controlling server; a participating server communicatively coupled to the controlling server; a plurality of users equipment (UEs) communicatively coupled to the participating server; a back-to-back user agent at the participating server for each of the plurality of UEs providing an interface for a Session Initiation Protocol (SIP) session for each of the plurality of UEs; and a media aggregator at the participating server configured to provide a Real Time Protocol (RTP) session and a Real Time Control Protocol (RTCP) session with the controlling server; wherein each of the plurality of UEs share the RTP session for media and the RTCP session for floor control between the controlling and participating servers.

In yet another exemplary embodiment, a PTT server includes a network interface communicatively coupled to a network, wherein the PTT server is communicatively coupled to at least one additional PTT server and a plurality of users equipment (UEs); a processor; memory storing instructions that, when executed, cause the processor to perform the steps of: participate in a group session between the plurality of UEs; participate in a Session Initiation Protocol (SIP) session for each of the plurality of UEs; share a single Real Time Protocol (RTP) session and a single Real Time Control Protocol (RTCP) session with the at least one additional PTT server, wherein at least two UEs of the plurality of UEs share the single RTP session and the single RTCP session; and send and receive floor control messages over the single RTCP session with each floor control message being one of a common message for each of the at least two UEs and an individual message for one of the at least two UEs with a unique identifier contained therein.

Referring to FIG. 1, in an exemplary embodiment, a network diagram illustrates a network 10 with media traffic optimization using an OMA PoC V2.1 NNI 12 between servers 14, 16. The network 10 includes a controlling server 14 and a participating server 16. Note, the network 10 can include additional participating servers 16 (not shown). The servers 14, 16 are PTT controllers, the controlling server 14 is associated with originating user equipment (ORG UE) 18, and the participating server 16 is associated with participating users equipment (UEs) 20, 22, 24. In this exemplary embodiment, the UE 18 establishes a group session 26 between the UEs 20, 22, 24. The group session 26 is hosted by the controlling server 14 with the NNI 12 to the participating server 16. In another exemplary embodiment, the controlling server is not associated with the originating UE but with the home domain of the group being called, in which case the originating UE's server assumes originating participating role.

The network 10 utilizes SIP, i.e., each UE 20, 22, 24 is invited into the group session 26 via SIP. However, since the UEs 20, 22, 24 are associated with the server 16, not the server 14, corresponding SIP sessions 30 (i.e., sessions 30a and 30b), 32 (i.e., sessions 32a and 32b), 34 (i.e., sessions 34a and 34b) are established between the controlling server 14 and the participating server 16 using back-to-back user agents (B2BUA) 40, 42, 44. Thus, there are multiple separate SIP sessions between the controlling and participating servers 14, 16 for each UE 20, 22, 24 that belongs to the participating server 16. Specifically, there are two SIP sessions for each UE 20, 22, 24 associated with the participating server 16. Note, the SIP sessions 30a, 32a, 34a are between the controlling and participating servers 14, 16 and the SIP sessions 30b, 32b, 34b are the same SIP sessions between the participating server 16 and the UEs 20, 22, 24.

To be able to distribute media between the servers 14 and 16, the network 10 also needs RTP sessions 50, 52, 54 and RTCP sessions 60, 62, 64 between the group session 26 and the UEs 20, 22, 24, i.e., one RTP and one RTCP session for each SIP session. The RTP sessions 50, 52, 54 and the corresponding RTCP sessions 60, 62, 64 are handled similarly as the corresponding SIP sessions 30, 32, 34 in the network 10, i.e., via the B2BUAs 40, 42, 44. The RTP sessions 50, 52, 54 are used for media and the RTCP sessions 60, 62, 64 are used for floor control signaling for each corresponding SIP session 30, 32, 34. Thus, the controlling server 14 communicates with each UE 20, 22, 24 individually (via the participating server 16). A floor control message that should be sent to all participants (e.g., media transmission idle (MBCP Idle)) is duplicated by the controlling server 14 and sent on each of the RTCP sessions 60, 62, 64.

The network 10 does include traffic optimization with the OMA PoC NNI 12 utilizing a media aggregation function 70 at the participating server 16. According to OMA PoC V2.1 traffic optimization mechanisms, only one of the RTP sessions 50, 52, 54 between the servers will be used for outbound media. Then the participating server 16 fans the media packet to all participating UEs 20, 22, 24 via the media aggregation function 70. For example, in the network 10, the RTP session 52 is used for all media from the controlling server 14 to the participating server 16 while the RTP sessions 50, 54 are uni-directional only from the participating server 16 to the controlling server 14.

Figure 2:
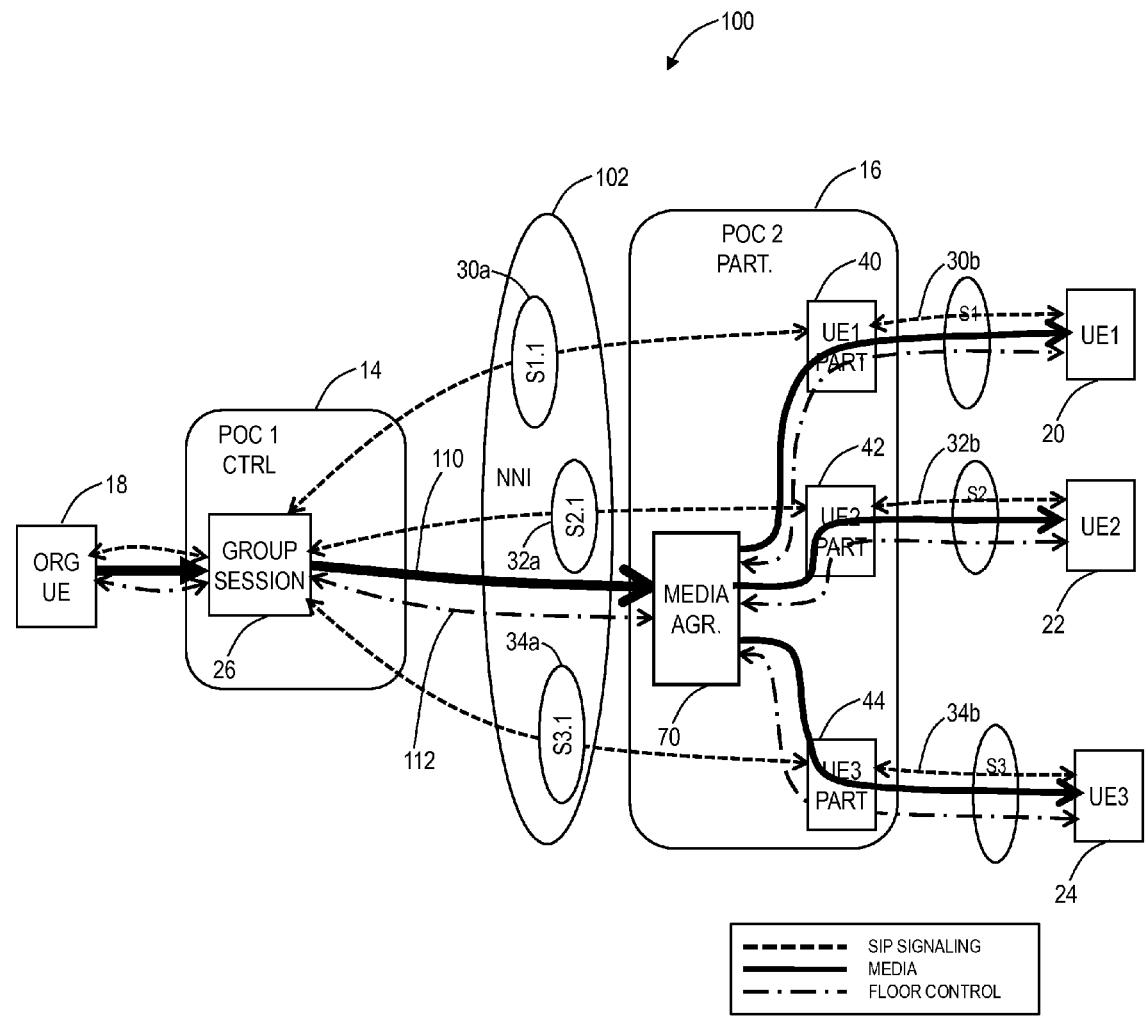
FIG. 2 is a network diagram of a network with floor control and media traffic optimization using a NNI between servers in accordance with some embodiments.

Referring to FIG. 2, in an exemplary embodiment, a network diagram illustrates a network 100 with floor control and media traffic optimization based on the enhanced PTT systems and methods using a NNI 102 between the servers 14 16. In an exemplary embodiment, the NNI 102 can be based on the OMA PoC NNI 12 utilizing similar media traffic optimization. Further, the NNI 102 is optimized with floor control traffic optimization as well. The network 100 includes the SIP sessions 30, 32, 34 similarly as in the network 10, i.e., SIP sessions 30a, 32a, 34a are established between the controlling server 14 and the participating server 16 using back-to-back user agents (B2BUA) 40, 42, 44 to join/leave/modify chat group session, etc., and SIP sessions 30b, 32b, 34b are established between the participating server 16 and the UEs 20, 22, 24. Note, the SIP sessions 30, 32, 34 can be standard OMA PoC SIP sessions.

For optimization, the network 100 includes a single RTP session 110 and a single RTCP session 120 between the servers 14 and 16. Note that the RTP sessions 50, 52, 54 and the RTCP sessions 60, 62, 64 of network 10 are not required in the network 100. The RTP session 110 and the RTCP session 112 are between the group session 26 at the controlling server 14 and the media aggregation function 70 at the participating server 16. The participating server 16 splits the RTP session 110 and the RTCP session 112 to each UE 20, 22, 24. With respect to the RTP session 110, the controlling server 14 sends a single media stream to the participating server 16 via RTP session 110. The participating server 16 then distributes the media to the UEs 20, 22, 24 similar to standard OMA PoC with traffic optimization.

Assume the UE 20 is the first UE that joins the group session 26. The SIP session 30 is setup when the UE 20 from the participating server 16 joins the group. Since the UE 20 is the first UE, the RTP session 110 and the RTCP session 112 are setup with the SIP session 30. Assume the UE 22 is the second UE to join the group. When the UE 22 joins, the SIP session 32 is established, but the SIP session 32 will use the RTP session 110 and the RTCP session 112, i.e., SIP session 32 uses the same Session Description Protocol (SDP) parameters (e.g., the same SDP parameters in INVITE and 200 OK messages) as SIP session 30. The controlling server 14 sends a single common floor control message (to be delivered to all UEs 20, 22, 24) to the participating server 16 via the RTCP session 112. Exemplary common floor control messages can include FLOOR OPEN, FLOOR TAKEN, etc. The participating server 16 distributes the floor control message to the UEs 20, 22, 24.

For individual floor control messages from the controlling server 14, the message includes indication of the target UE to allow the participating server 16 to route the floor control message to the proper UE. A FLOOR GRANT is an exemplary individual floor control message sent from the controlling server 14 to the participating server 16. For individual floor control messages to the controlling server 14, the participating server 14 uses the source SSRC to identify the sending UE since RTCP messages already include the source's SSRC. A FLOOR REQUEST is an exemplary individual floor control message sent from the participating server 16 to the controlling server 14. Thus, in an exemplary embodiment, the NNI 102 can be similar to the OMA PoC NNI 12 with the servers 14, 16 configured to share the RTP session 110 and the RTCP session 112.

The controlling and participating servers 14, 16 learn the SSRC of each participant during initial SIP session setup (e.g., when joining the chat group), i.e., the UEs 20, 22, 24 provide their SSRCs that they are going to use for the (chat) group session in the INVITE (e.g., as an additional SDP parameter). The SSRC (synchronization source) is a 32 bit value chosen randomly, with the intent that no two synchronization sources within the same RTP session will have the same SSRC. In an exemplary embodiment, the controlling server 14 can generate unique (within the session) SSRCs for each participant and insert it into a 200 OK message to the participating server 16. The 200 OK message is a SIP message. In another exemplary embodiment, the SSRC for each participant can be negotiated between the controlling server 14 and the UE during the session setup similarly as SDP parameters, i.e., the UE proposes its SSRC in the INVITE and the controlling server 14 accepts it or provides a new one (e.g., to make SSRC unique within the group session). The enhanced PTT systems and methods can include various implementations for SSRC negotiation. In another exemplary embodiment, the participating server 16 and the controlling server 14 can generate a unique SSRC for each UE and the participating server can store the mapping of SSRC of the UE for both SIP sessions (UE and B2B SIP session) and interwork the two.

Figure 3:
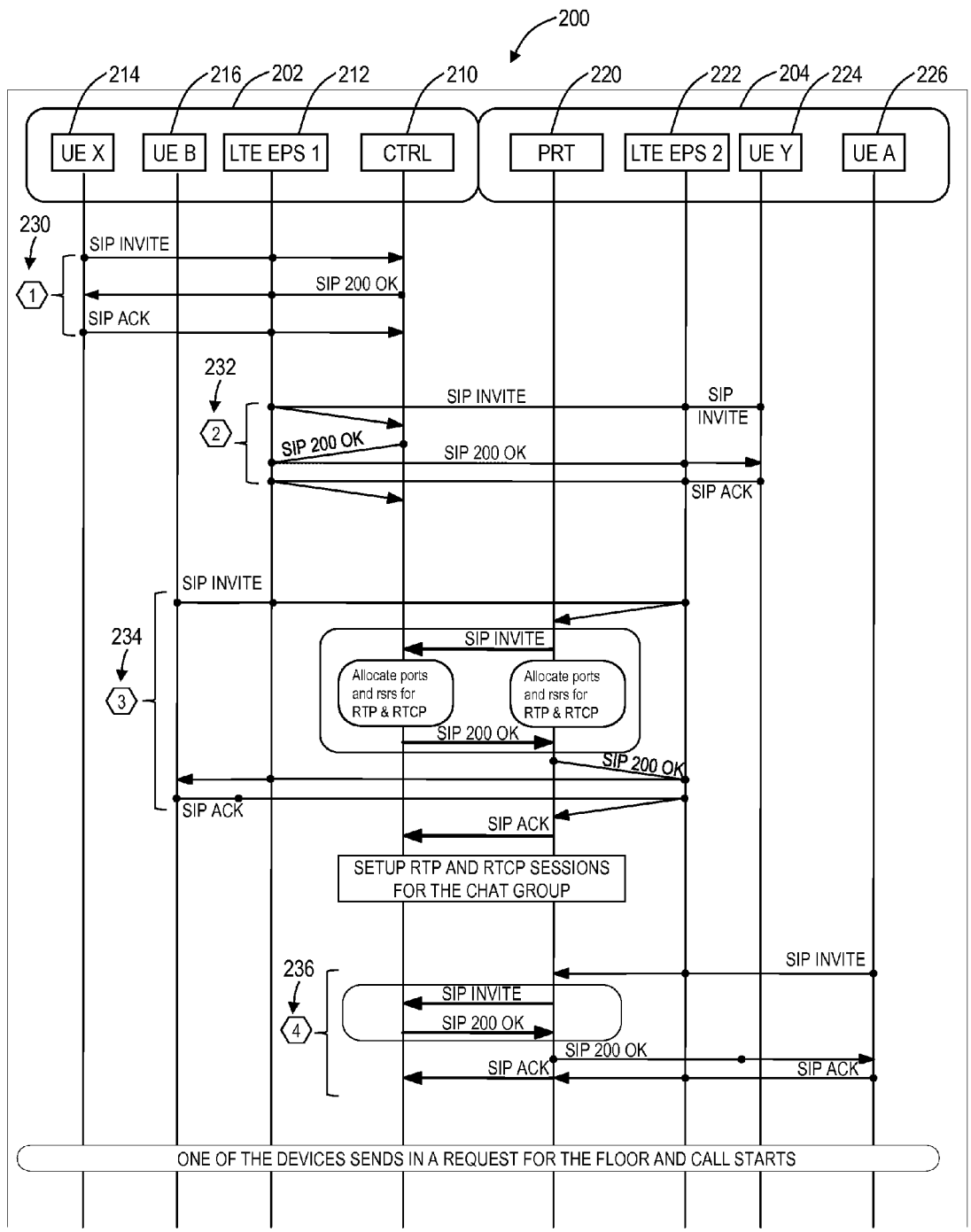
FIG. 3 is a flow diagram illustrates an exemplary operation of the enhanced PTT systems and methods between networks in accordance with some embodiments.

Referring to FIG. 3, in an exemplary embodiment, a flow diagram illustrates an exemplary operation 200 of the enhanced PTT systems and methods between networks 202, 204. In this exemplary embodiment, the networks 202, 204 are Long Term Evolution (LTE) networks. The network 202 includes a controlling server 210, an LTE Evolved Packet System (EPS) 212, a UE X 214, and a UE B 216. The network 204 includes a participating server 220, an LTE EPS 222, a UE Y 224, and a UE A 226. The controlling and participating servers 210, 220, again, may be PTT controllers. The flow diagram generally illustrates how the different UEs 214, 216, 224, 226, being at home or visiting the network 202, join a chat group. In the exemplary operation 200, a chat group is homed at the controlling server 210. Both the UE X 214 and the UE Y 224 belong to the controlling server 210. The UE X 214 is located in its home network 202, but the UE Y 224 is visiting the network 204. Both the UE A 226 and the UE B 216 belong to the participating server 220. The UE A 226 located in its home network 204, but the UE B 216 is visiting the network 202. Each of the UEs 214, 216, 224, 226 is joining a same chat group homed by the controlling server 210. Notice that the order of devices joining the chat session is not important. The sequence of joining events in the exemplary operation 200 is one of various possible scenarios.

At a point 230, the UE X 214 joins the chat session. The UE X 214 sends an INVITE with a chat group identity to the controlling server 210. Since the UE X 214 is at home in the network 202, the message goes directly to the controlling server 210 via the LTE EPS 212. Since the controlling server 210 owns the chat group, it becomes designated a controlling server for this chat group session. Note, those of ordinary skill in the art will appreciate the designation of participating and controlling servers can change based on a specific configuration and that each PTT server described herein can behave as either a controlling server or a participating server. The controlling server 210 and the UE X 214 exchange SIP messages to setup a chat group session. The controlling server 210 and the UE X 214 also setup an RTCP session for floor control messages.

At a point 232, the visiting UE Y 224 joins the chat session. The UE Y 224 sends an INVITE with the chat group identity to the controlling server 210. Since the UE Y 224 is visiting the network 204, the message goes to the controlling server 210 via the LTE EPS 222 and the LTE EPS 212. Since the controlling server 210 is the controlling server for this chat group session, the controlling server 210 joins the UE Y 224 to the chat group session. The controlling server 210 and the UE Y 224 exchange SIP messages to complete a SIP session setup. The controlling server 210 and the UE Y 224 setup a RTCP session for floor control messages.

At a point 234, the UE B 216 homed off the participating server 220 joins the chat group session. Note, the UE B 216 is the first UE not homed off the controlling server 210. The UE B 216 sends an INVITE with the chat group identity to the participating server 220. Since the UE B 216 is visiting the network 202, the message goes to the participating server 220 via the LTE EPS 212 and the LTE EPS 222. Since the participating server 220 does not own this chat group it becomes a participating server for the UE B 216 in this chat group session. If the UE B 216 is the first device homed in the participating server 220 to join (initiate) a chat group homed in another server, then the following steps take place. The participating server 220 (as a B2BUA) sets up a SIP session with the controlling server 210 on behalf of the UE B 216. The servers 210, 220 allocate IP addresses and ports for RTP and RTCP sessions and exchange those IP:port information during a SDP parameters negotiation procedure.

Both the servers 210, 220 allocate necessary resources and establish RTP and RTCP sessions between them in association with the chat group session. Notice that another option can be allocating recourses and establishing an RTP session later, when a group session actually starts. The participating server 220 and the UE B 216 exchange SIP messages to complete SIP session setup (via the LTE EPS 212 and the LTE EPS 222). The controlling server 210 and the UE B 216 setup a RTCP session for Floor Control messages.

At a point 236, the UE A 226 homed by the participating server 220 joins the chat group session. The UE A 226 belongs to the participating server 220, is at home in the network 204, and wants to join the same chat group. The UE A 226 sends an INVITE with the chat group identity to the participating server 220. Since the UE A 226 is at home, the message goes directly to the participating server 220 via the LTE EPS 222. Since the participating server 220 does not own this chat group and is already a participating server for this chat group, the participating server 220 joins the UE A 226 to the chat group session. Specifically, the participating server 220 (as a B2BUA) sets up a new SIP session with the controlling server 210 on behalf of the UE A 226.

Since RTP and RTCP sessions have been already established between the servers 210, 220, when setting up the SIP session for UE A 226 both the servers 210, 220 can re-use the IP:port information and other SDP parameters that have been already negotiated for the first UE participating in the chat group session and belonging to the participating server 220 (i.e., the UE B 216). Notice that resources have also been allocated already in the setup of the UE B 216. The participating server 220 and the UE A 226 exchange SIP messages to complete SIP session setup. The participating server 220 and the UE 226 setup an RTCP session for Floor Control messages while using the existing RTCP session between the participating server 220 and the controlling server 210.

Figure 4:
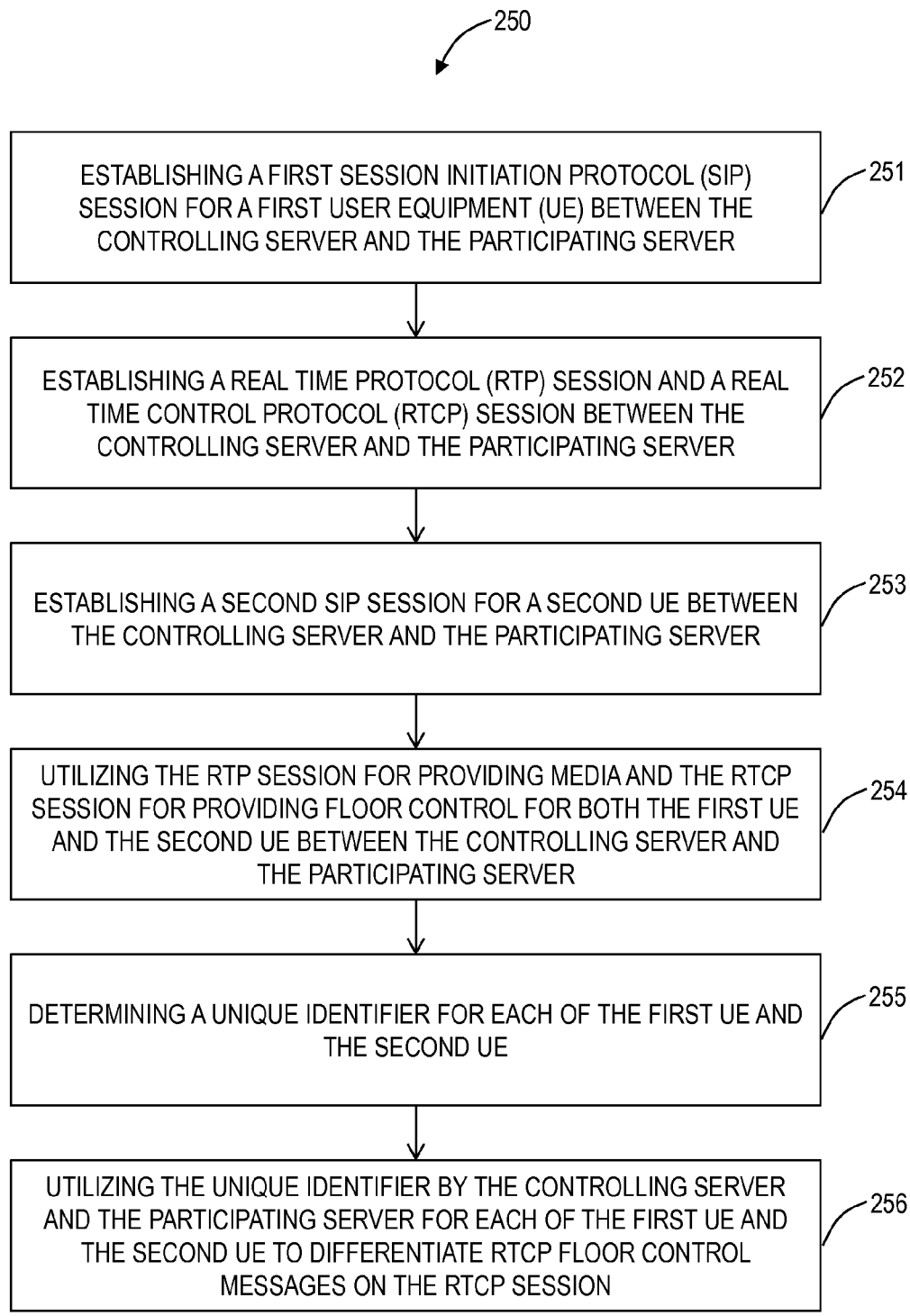
FIG. 4 is a flowchart of an exemplary enhanced PTT method between a controlling server and a participating server in accordance with some embodiments.

Referring to FIG. 4, in an exemplary embodiment, a flowchart illustrates an exemplary enhanced PTT method 250 between a controlling server and a participating server. In an exemplary embodiment, the enhanced PTT method 250 can be implemented by the servers 14 and 16 and the UEs 18, 20, 22, and 24. The enhanced PTT method 250 includes establishing a first Session Initiation Protocol (SIP) session for a first user equipment (UE) between the controlling server and the participating server (step 251). The enhanced PTT method 250 further includes establishing a Real Time Protocol (RTP) session and a Real Time Control Protocol (RTCP) session between the controlling server and the participating server (step 252). As described herein, the RTP and RTCP sessions are established with the first UE from the participating server. The enhanced PTT method 250 includes establishing a second SIP session for a second UE between the controlling server and the participating server (step 253). Note, the second UE is on the same participating server as the first UE joining the group session, and the second UE has a SIP session through the participating server to the controlling server.

The enhanced PTT method 250 includes utilizing the same RTP session for providing media and the same RTCP session for providing floor control for both the first UE and the second UE between the controlling server and the participating server (step 254). As described herein, the first and second UE will share the same RTP and RTCP session between the controlling and participating servers, thereby eliminating the conventional requirement of one RTP and one RTCP session per UE on the participating server. The enhanced PTT method 250 further includes determining a unique identifier for each of the first UE and the second UE (step 255). The enhanced PTT method 250 includes utilizing the unique identifier by the controlling server and the participating server for each of the first UE and the second UE to differentiate RTCP floor control messages on the RTCP session (step 256). The unique identifier can include a synchronization source (SSRC) of each of the UEs.

Figure 5:
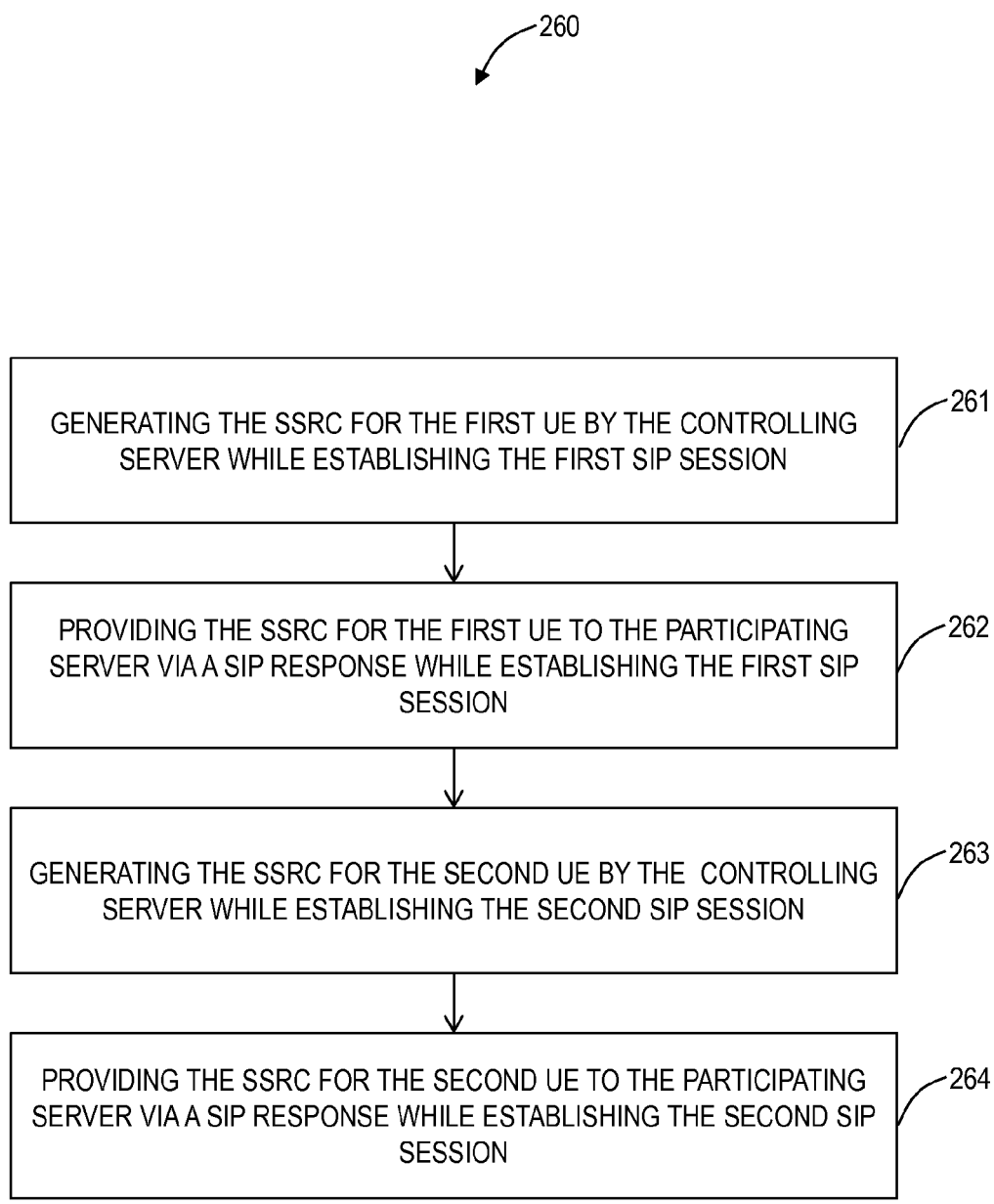
FIG. 5 is a flowchart of an exemplary synchronization source (SSRC) selection method between a controlling server, a participating server, and a first and second user equipment (UE) in accordance with some embodiments.

Referring to FIG. 5, in an exemplary embodiment, a flowchart illustrates an exemplary SSRC selection method 260 between a controlling server, a participating server, and a first and second UE. Specifically, the SSRC selection method 260 can be used to determine the unique identifiers for steps 255-256 in the enhanced PTT method 250. The SSRC selection method 260 includes generating the SSRC for the first UE by the controlling server while establishing the first SIP session (step 261). The SSRC selection method 260 further includes providing, by the controlling server to the participating server, the SSRC for the first UE via a first SIP message (step 262). The SSRC selection method 260 further includes generating the SSRC for the second UE by the controlling server while establishing the second SIP session (step 263). The SSRC selection method 260 further includes providing, by the controlling server to the participating server, the SSRC for the second UE via a second SIP message (step 264). In an exemplary embodiment, each of the first and second SIP messages can be a 200 OK message that includes the corresponding SSRC although other message types are contemplated.

Figure 6:
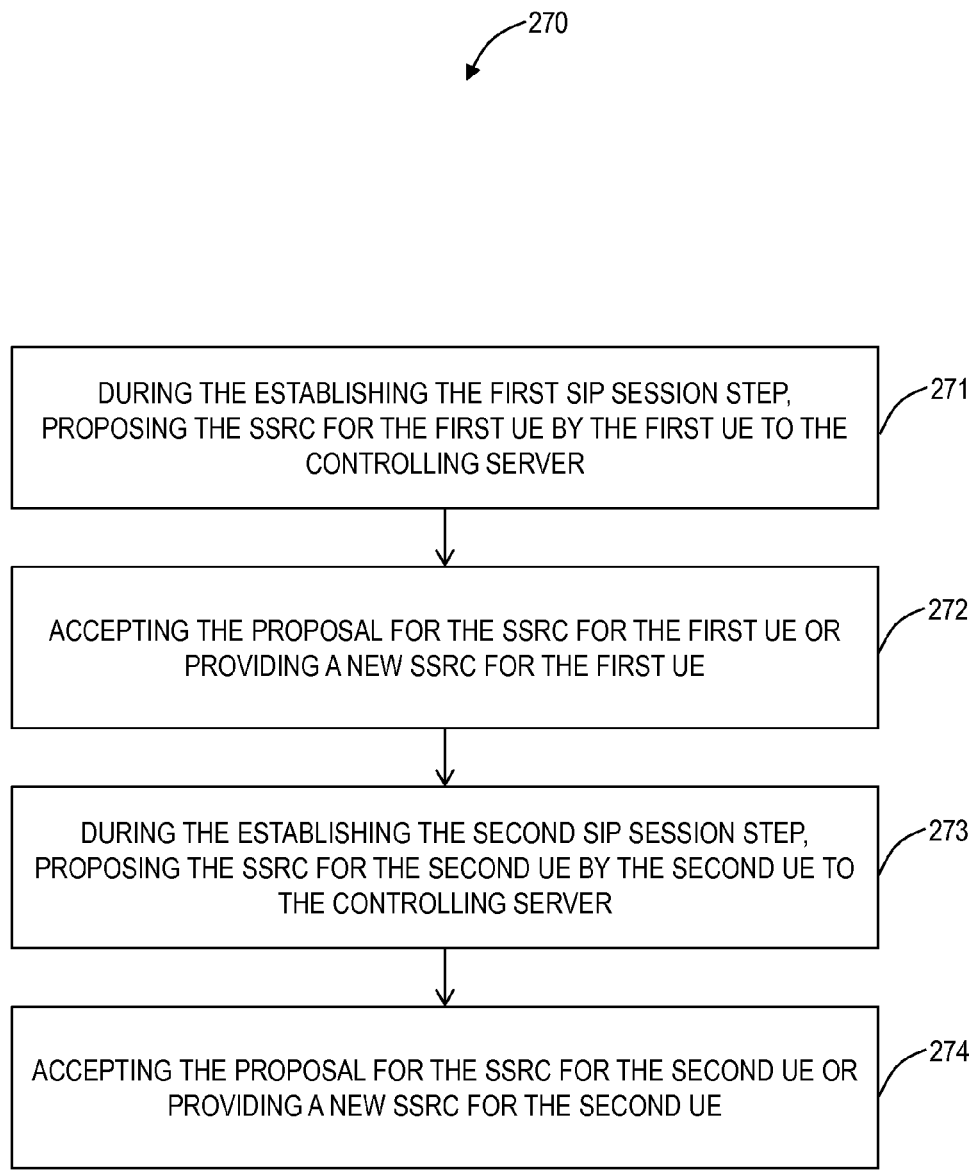
FIG. 6 is a flowchart of another exemplary SSRC selection method between a controlling server, a participating server, and a first and second UE in accordance with some embodiments.

Referring to FIG. 6, in an exemplary embodiment, a flowchart illustrates another exemplary SSRC selection method 270 between a controlling server, a participating server, and a first and second UE. Specifically, the SSRC selection method 270 can be used to determine the unique identifiers for steps 255-256 in the enhanced PTT method 250. The SSRC selection method 270 includes, in association with the establishing the first SIP session at step 251 of enhanced PTT method 250, proposing, by the first UE to the controlling server, the SSRC for the first UE (step 271). The SSRC selection method 270 further includes accepting, by the controlling server, the proposal for the SSRC for the first UE or providing, by the controlling server, a new SSRC for the first UE (step 272). The SSRC selection method 270 further includes, in association with the establishing the second SIP session at step 253 of enhanced PTT method 250, proposing, by the second UE to the controlling server, the SSRC for the second UE (step 273). The SSRC selection method 270 further includes accepting, by the controlling server, the proposal for the SSRC for the second UE or providing, by the controlling server, a new SSRC for the second UE (step 274).

Figure 7:
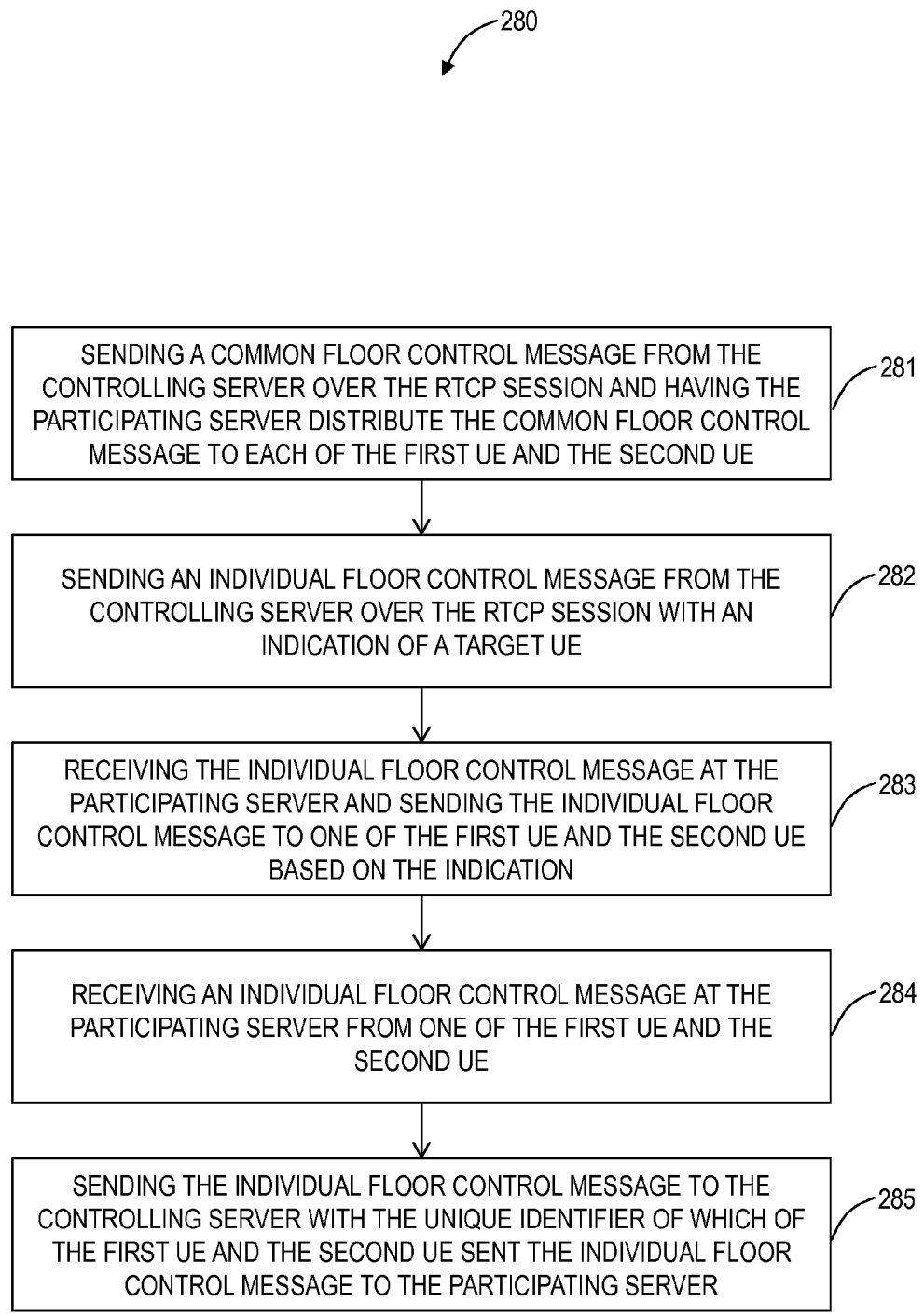
FIG. 7 is a flowchart of an exemplary messaging method on a shared RTCP session by a first and second UE in accordance with some embodiments.

Referring to FIG. 7, in an exemplary embodiment, a flowchart illustrates an exemplary messaging method 280 on a shared RTCP session by a first and second UE. The messaging method 280 can be used by a controlling server, a participating server, and/or the UEs to share the RTCP session while differentiating individual floor control messages thereon. The various steps in the messaging method 280 can be performed in any order and steps may also be omitted. The messaging method 280 includes sending a common floor control message from the controlling server over the RTCP session and having the participating server distribute the common floor control message to each of the first UE and the second UE (step 281).

The messaging method 280 further includes sending a first individual floor control message from the controlling server over the RTCP session with an indication of a target UE (step 282). The messaging method 280 further includes receiving the first individual floor control message at the participating server and sending the first individual floor control message to one of the first UE and the second UE based on the indication (step 283). The messaging method 280 further includes receiving a second individual floor control message at the participating server from one of the first UE and the second UE (step 284). The messaging method 280 further includes sending the second individual floor control message to the controlling server with the unique identifier of which of the first UE and the second UE that sent the second individual floor control message to the participating server (step 285).

Figure 8:
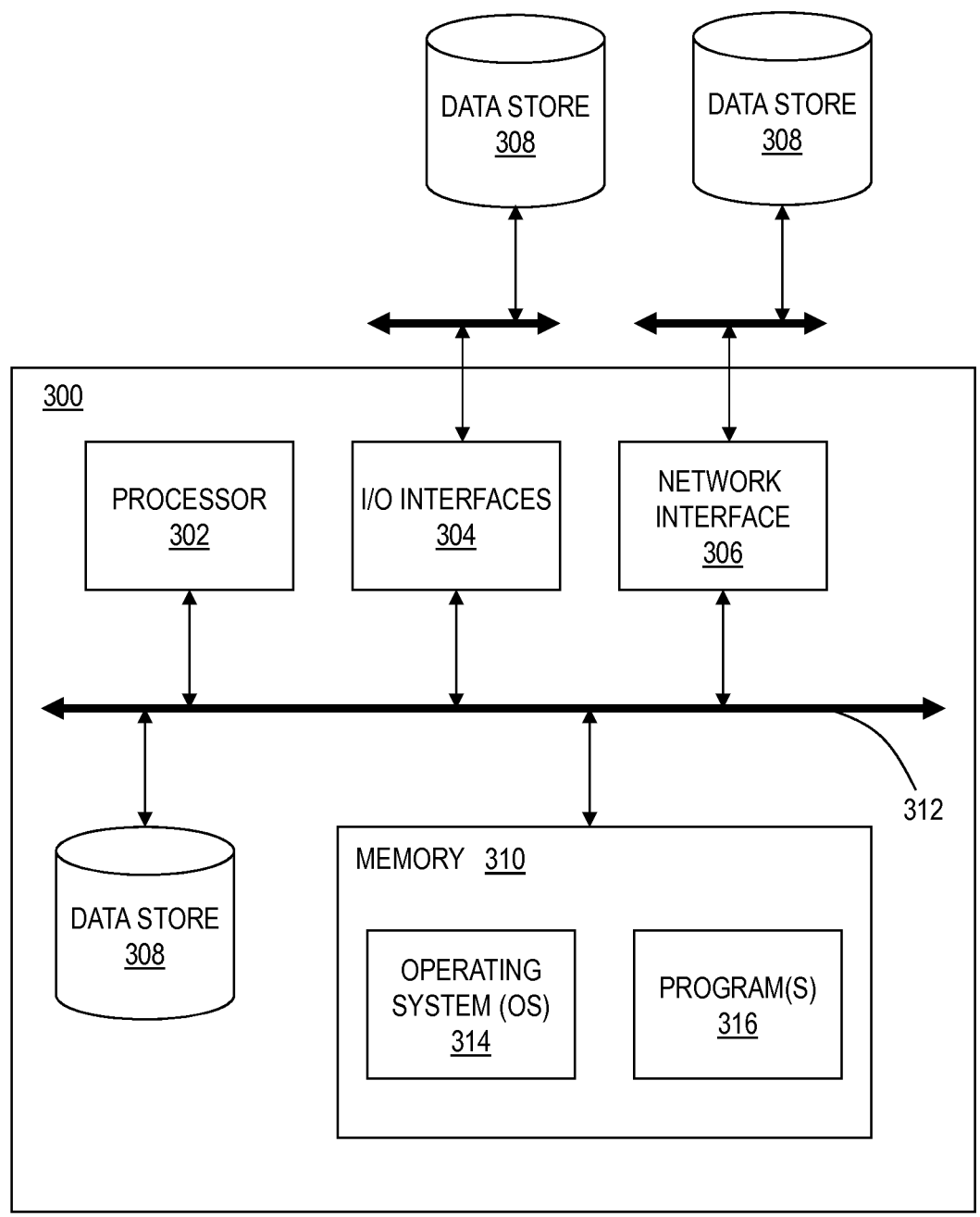
FIG. 8 is a block diagram of an exemplary implementation of the controlling and participant servers in accordance with some embodiments.

Referring to FIG. 8, in an exemplary embodiment, a block diagram illustrates an exemplary implementation of a server 300, for example, servers 14, 16, 210, and 220, for use in a network implementing PTT, such as networks 100 and 200. The server 300 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 8 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on a network, such as to communicate with other servers 14, 16 and/or with UEs. The network interface 306 can include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

As a controlling server, the server 300 can be configured to host a group session and to communicate to a back-to-back user agent at a participating server for each of the SIP sessions, and the server 300 can be configured to communicate to a media aggregator at the participating server for the single RTP session and the single RTCP session. As a participating server, the server 300 can include a back-to-back user agent for each of the SIP sessions that communicates to the controlling server and a media aggregator for the single RTP session and the single RTCP session.

Figure 9:
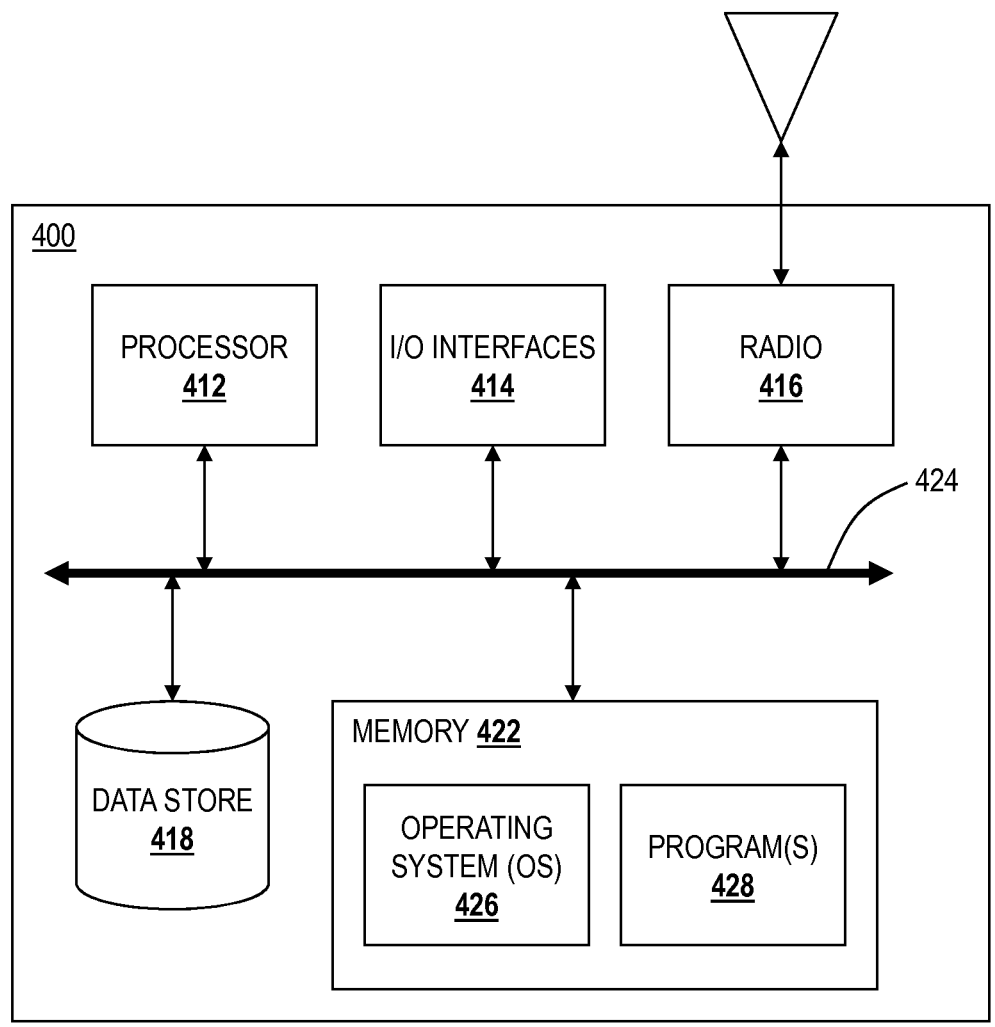
FIG. 9 is a block diagram of an exemplary implementation of the UE in accordance with some embodiments.

Referring to FIG. 9, in an exemplary embodiment, a block diagram of an exemplary implementation of a UE 400, such as UEs 20, 22, 24, 214, 216, 224, and 226. The UE 400 can be a digital device that, in terms of hardware architecture, generally includes a processor 412, input/output (I/O) interfaces 414, a radio 416, a data store 418, and memory 422. It should be appreciated by those of ordinary skill in the art that FIG. 9 depicts the UE 400 in an oversimplified manner, and a practical embodiment can include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the UE 400, a semiconductor-based microprocessor (in the form of a microchip or chip set), or generally any device for executing software instructions. When the UE 400 is in operation, the processor 412 is configured to execute software stored within the memory 422, to communicate data to and from the memory 422, and to generally control operations of the UE 400 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the UE 400.

The radio 416 enables wireless communication to an external access device or network. Any number of suitable wireless data communication protocols, techniques, or methodologies can be supported by the radio 416, including, without limitation: RF; LMR; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; LTE; cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 can be used to store data. The data store 418 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 can incorporate electronic, magnetic, optical, and/or other types of storage media.

The memory 422 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 can have a distributed architecture, where various components are situated remotely from one another, but can be accessed by the processor 412. The software in memory 422 can include one or more software programs, each of which includes an ordered listing of executable instructions for implementing logical functions. In the example of FIG. 9, the software in the memory 422 includes a suitable operating system (O/S) 426 and programs 428. The operating system 426 essentially controls the execution of other computer programs, and provides scheduling, input-output control, file and data management, memory management, and communication control and related services. The programs 428 can include various applications, add-ons, etc. configured to provide end user functionality with the UE 400.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An enhanced push to talk (PTT) method for establishing a group session between a controlling server and a participating server, comprising:
   establishing a first Session Initiation Protocol (SIP) session for a first user equipment (UE) between the controlling server and the participating server;
   establishing a Real Time Protocol (RTP) session and a Real Time Control Protocol (RTCP) session between the controlling server and the participating server;
   establishing a second SIP session for a second UE between the controlling server and the same participating server; and
   utilizing the same RTP session for providing media and the same RTCP session for providing floor control for both the first UE and the second UE between the controlling server and the participating server;
   wherein the first UE and the second UE are homed at the participating server and the associated group is homed at the controlling server.

2. The enhanced PTT method of claim 1, further comprising:
   determining a unique identifier for each of the first UE and the second UE; and
   utilizing the unique identifier by the controlling server and the participating server for each of the first UE and the second UE to differentiate RTCP floor control messages on the RTCP session.

3. The enhanced PTT method of claim 2, wherein the unique identifier comprises a synchronization source (SSRC).

4. The enhanced PTT method of claim 3, further comprising:
   generating the SSRC for the first UE by the controlling server while establishing the first SIP session;
   providing the SSRC for the first UE to the participating server via a first SIP message;
   generating the SSRC for the second UE by the controlling server while establishing the second SIP session; and
   providing the SSRC for the second UE to the participating server via a second SIP message.

5. The enhanced PTT method of claim 3, further comprising:
   during the establishing the first SIP session step, proposing the SSRC for the first UE by the first UE to the controlling server;
   accepting the proposal for the SSRC for the first UE or providing a new SSRC for the first UE;
   during the establishing the second SIP session step, proposing the SSRC for the second UE by the second UE to the controlling server; and
   accepting the proposal for the SSRC for the second UE or providing a new SSRC for the second UE.

6. The enhanced PTT method of claim 2, further comprising:
   sending a common floor control message from the controlling server over the RTCP session and having the participating server distribute the common floor control message to each of the first UE and the second UE.

7. The enhanced PTT method of claim 2, further comprising:
   sending an individual floor control message from the controlling server over the RTCP session with a target UE indication of a target UE; and
   receiving the individual floor control message at the participating server and sending the individual floor control message to one of the first UE and the second UE based on the target UE indication.

8. The enhanced PTT method of claim 2, further comprising:
   receiving an individual floor control message at the participating server from one of the first UE and the second UE; and
   sending the individual floor control message to the controlling server with the unique identifier of which of the first UE and the second UE sent the individual floor control message to the participating server.

9. The enhanced PTT method of claim 2, further comprising:
   establishing at least one additional SIP session for each of at least one additional UE between the controlling server and the participating server; and
   utilizing the RTP session for providing media and the RTCP session for providing floor control for each of the first UE, the second UE, and the at least one additional UE between the controlling server and the participating server.

10. The enhanced PTT method of claim 1, wherein interfaces between the controlling server and the participating server are compliant to Open Mobile Alliance (OMA) Push to talk Over Cellular V2.1 (August, 2011).

11. A network, comprising:
    a controlling server;
    a participating server communicatively coupled to the controlling server;
    a plurality of users equipment (UEs) communicatively coupled to the participating server;
    a back-to-back user agent at the participating server for each of the plurality of UE providing an interface for a Session Initiation Protocol (SIP) session for each of the plurality of UEs; and
    a media aggregator at the participating server configured to provide a Real Time Protocol (RTP) session and a Real Time Control Protocol (RTCP) session with the controlling server;
    wherein each of the plurality of UEs share the same RTP session for media and the same RTCP session for floor control between the controlling server and the participating server.

12. The network of claim 11, wherein each of the plurality of UE comprise a unique identifier known to each of the participating server and the controlling server, and wherein the unique identifier is utilized to determine source of or target/destination of RTCP floor control messages on the RTCP session.

13. The network of claim 12, wherein the unique identifier comprises a synchronization source (SSRC).

14. The network of claim 13, wherein the SSRC for each of the plurality of UE is generated by the controlling server when the associated SIP session is established and the generated SSRC is communicated by the controlling server to the participating server in a SIP message.

15. The network of claim 13, wherein the SSRC for each of the plurality of UEs is proposed by the UE to the controlling server which either accepts the proposed SSRC or provides a new SSRC to the UE in a SIP message.

16. A push to talk (PTT) server, comprising:
a network interface that is configured to communicatively couple the PTT server to a network and, via the network, to another PTT server and a plurality of users equipment (UEs);
a processor;
memory that is configured to store instructions that, when executed, cause the processor to perform the steps of:
participate in a group session between the plurality of UEs;
participate in a Session Initiation Protocol (SIP) session for each of the plurality of UEs;
share a same, single Real Time Protocol (RTP) session and a same, single Real Time Control Protocol (RTCP) session with the another PTT server, wherein at least two UEs of the plurality of UEs share the single RTP session and the single RTCP session; and
send floor control messages to, and receive floor control messages from, the another PTT server via the network interface and over the single RTCP session, with each floor control message being one of a common message for each of the at least two UEs and an individual message for one of the at least two UEs with a unique identifier contained therein.

17. The PTT server of claim 16, wherein the unique identifier comprises a synchronization source (SSRC) for each of the at least two UEs.

18. The PTT server of claim 16, wherein the instructions, when executed, further cause the processor to perform the steps of:
operate an interface with the at least one additional PTT server compliant to Open Mobile Alliance (OMA) Push to talk Over Cellular V2.1 (August, 2011).

19. The PTT server of claim 16, wherein the PTT server is designated as a controlling server for the group session and the another PTT server is designated as a participating server;
wherein the controlling server is configured to host the group session and to communicate to a back-to-back user agent at the participating server for each of the SIP sessions; and
wherein the controlling server is configured to communicate to a media aggregator at the participating server for the single RTP session and the single RTCP session.

20. The PTT server of claim 16, wherein the PTT server is designated as a participating server for the group session and the another PTT server is designated as a controlling server;
wherein the participating server comprises a back-to-back user agent for each of the SIP sessions that communicates to the controlling server; and
wherein the participating server comprises a media aggregator for the single RTP session and the single RTCP session.

* * * * *